3,010,904
LUBRICATING GREASES THICKENED WITH DIOXAZINE CARBAZOLE COMPOUNDS
Norman R. Odell, Fishkill, N.Y., assignor to Texaco Inc., a corporation of Delaware
No Drawing. Filed Dec. 23, 1958, Ser. No. 782,406
8 Claims. (Cl. 252—51.5)

This invention relates to lubricating greases having improved high temperature and other lubricating properties. More particularly it relates to lubricating greases thickened with certain high melting dioxazine carbazole compounds.

The compounds which are employed as grease thickening agents in accordance with this invention are those represented by the following structural formula

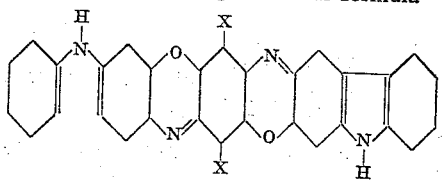

wherein X represents hydrogen, —R or —OR groups or halogen, and wherein R is a lower alkyl group containing from 1 to about 6 carbon atoms, and preferably from 1 to 4 carbon atoms. Particularly suitable compounds of this class are those wherein X is chlorine or a methyl, ethyl, methoxy or ethoxy group.

The above compounds are high melting solids, which are commonly employed as textile pigments. Compounds of this class are commercially available, and obtained by well known reactions. For example, the above compound wherein X is chlorine is obtained by condensing 3-amino-carbazole with chloranil, and then effecting ring closure by refluxing the reaction product in a high boiling solvent such as nitrobenzene in the presence of a catalyst such as p-toluenesulfonyl chloride (Lubs, "The Chemistry of Synthetic Dyes and Pigments" (A.C.S. Monograph No. 127), pp. 288–9). This compound may be reacted with a metal alcoholate to form the compound wherein X is an —OR group, or with an alkyl halide in the Wurtz-Fittig reaction to form the compound of the formula wherein X is an —R group.

The greases of this invention comprise essentially a lubricating oil containing a compound of the above class in an amount sufficient to impart at least substantial thickening. The composition may contain from about 5 to about 45 percent by weight of a thickening agent of this type, and preferably about 15 to about 35 percent by weight of such thickening agent, based on the weight of the composition. The carbazole derivative is employed in finely divided form, suitably in the form of particles having a particle size in about the range 0.10 to about 5.0 microns in diameter.

The lubricating oils employed may be any suitable oils of lubricating characteristics, including the conventional mineral lubricating oils, synthetic oils obtained by various refinery processes, such as cracking and polymerization, and other synthetic oleaginous compounds. Suitable mineral oils include paraffinic and naphthenic oils having viscosities in the range from about 80 seconds Saybolt Universal at 100° F. to about 225 seconds Saybolt Universal at 210° F., and preferably those having viscosities in the range from about 100 to about 600 seconds Saybolt Universal at 100° F. For preparing high temperature greases, synthetic oils of various types, including particularly silicone oils and polyesters are preferably employed. Such oils may very advantageously comprise from about 50 up to 100 percent of the oil component of the grease, the remainder being mineral oil or other oil of a different type.

A particularly suitable class of synthetic polyester oils are those disclosed by R. T. Sanderson in U.S. 2,628,974, obtained by reacting dibasic aliphatic acids with glycols and end-blocking the reaction products with monohydric aliphatic alcohols or monocarboxylic aliphatic acids. The preferred materials of this character are products obtained by reacting mono- or polyalkylene glycols with dicarboxylic acids and monohydric alcohols, represented by the formula $R_2$—OOC—$R_1$—COO—(R—OOC—$R_1$—COO)$_x$—$R_2$ wherein R is an aliphatic hydrocarbon or an aliphatic ether group containing from 4 to 12 carbon atoms, $R_1$ and $R_2$ are aliphatic hydrocarbon groups containing from 1 to 12 carbon atoms and $x$ is an integer from 1 to 5.

The silicone oils are compounds having the general formula

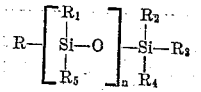

wherein R, $R_1$, $R_2$, $R_3$, $R_4$ and $R_5$ represent alkyl, aryl, alkaryl or aralkyl groups, which may be the same or different, and $n$ is a number sufficient to give a viscosity in the lubricating oil range to the compound, preferably a viscosity in about the range from about 100 to 600 seconds Saybolt Universal at 100° F. Suitable compounds of this type include dimethylsilicone polymer, diethylsilicone polymer, methylcyclohexylsilicone polymer, diphenylsilicone, methylphenylsilicone polymer, methylethylsilicone polymer, methyltolylsilicone polmer, etc. These materials may be prepared by various methods, including hydrolysis of hydrolizable organic-substituted silanes, as described for example in U.S. 2,410,346 and U.S. 2,469,888. Particularly suitable silicone oils are the methylchlorophenyl silicone polymers, wherein the organic groups are methyl and phenyl groups, including chlorophenyl groups, and containing at least about 3 percent by weight of chlorine. A particularly suitable material of this character is the commercial product sold by the General Electric Company under the trade name of Versilube F-50, which has a viscosity of about 180 to 280 seconds Saybolt Universal at 100° F. and contains about 5–10 percent by weight of chlorine.

Additives of the usual types may be employed in these greases, such as, for example, oxidation inhibitors, corrosion inhibitors, tackiness agents, extreme pressure agents, rust inhibitors, etc. Suitable oxidation inhibitors include particularly those of the amine type, such as diphenylamine, alphanaphthylamine, betanaphthylamine, paraphenylenediamine and N,N'-diphenyl-p-phenylenediamine. Compounds of this type may be present in amounts from about 0.05 to about 5 percent by weight, based on the weight of the composition. Also, additional thickening agents may be employed, such as other finely divided solids of various types and metal soaps of high molecular weight fatty acids such are as are conventionally employed in lubricating greases.

The grease preparation may be carried out by merely mixing together the thickener and any additive employed with the lubricating oil, employing any convenient means such as milling in a colloid mill or a paint mill to obtain a thorough dispersion of the thickener and additives in the lubricating oil base. The mixing may be carried out at ordinary temperatures or at elevated temperatures up to about 300° F. in order to dissolve any difficultly soluble additives.

A grease representative of the greases of this invention is obtained by thickening Versilube F-50 with 25.0 percent by weight of the carbazole compound of the formula given hereinabove wherein X is a chlorine atom, having an average particle size of about 0.75 micron in diameter. The grease preparation is carried out by mixing 100 grams of the carbazole compound with 300 grams of Versilube F-50 and milling the mixture with one pass through a Premier Colloid mill at 0.002 inch clearance. A smooth N.L.G.I. No. 2 grade grease of good appearance and lubricating properties, including excellent oxidation resistance for an uninhibited grease and good water resistance properties, is obtained, as shown by the following test results:

| | |
|---|---|
| Worked penetration at 77° F. (converted from ¼ cone) | 290 |
| Dropping point, ° F | 500+ |
| ASTM bomb oxidation test (100 lbs. at 250° F.), pressure drop, p.s.i. | 3 |
| Dynamic water resistance test, percent loss | 2.5 |
| Water absorption test: | |
| Water absorbed, percent | 30 |
| Penetration of emulsion (converted from ¼ cone) | 305 |

As a further example of the greases of this invention, a mineral oil base grease is obtained by thickening a refined naphthene base distillate oil having a Saybolt Universal viscosity at 100° F. of about 310 seconds with 24.5 percent by weight of the compound of the formula given hereinabove wherein X is an ethyl group. This compound is employed in the form of particles below about 1.0 micron in diameter. The composition contains 1.0 percent by weight of diphenylparaphenylenediamine also, as an oxidation inhibitor. The grease preparation is carried out as described above, employing these materials in the indicated proportions by weight. A smooth N.L.G.I. No. 0 grade grease is obtained having a dropping point above 500° F. and good lubricating properties generally, including excellent oxidation resistance and water stability.

As a still further example of the greases of this invention, a grease is obtained by thickening a synthetic polyester oil with 25.0 percent by weight of the carbazole compound of the formula given hereinabove wherein X is a methoxy group. The grease also contains 1.0 percent by weight of diphenylparaphenylenediamine as an oxidation inhibitor. The synthetic polyester is obtained by reacting sebacic acid, 2-ethylhexane-1, 3-diol and 2-ethylhexanol in about a 2:1:2 ratio respectively, and consists predominantly of the compound

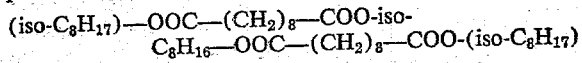

(iso-C$_8$H$_{17}$)—OOC—(CH$_2$)$_8$—COO-iso-C$_8$H$_{16}$—OOC—(CH$_2$)$_8$—COO-(iso-C$_8$H$_{17}$)

The grease preparation is carried out as described above, by mixing these materials in the indicated proportions by weight and milling. A smooth N.L.G.I. No. 2 grade grease is obtained having a dropping point above 500° F. and good lubricating properties generally.

The above grease also has very superior high temperature performance properties for a synthetic polyester base grease, represented by a performance life of 275 hours in the high temperature performance test at 400° F. This test is a test for determining the performance characteristics of greases in anti-friction bearings at elevated temperatures and high rotative speeds. It is carried out as described for example, in U.S. 2,639,266, col. 7, l. 42—col. 8, 1. 34, employing a test apparatus which comprises a steel spindle supported on ball bearings lubricated with the lubricant under test in an electrically heated housing. The test is carried out by rotating the spindle at 10,000 r.p.m. at the test temperature until the lubricant fails, which is indicated by rupture of a low amperage fuse in the motor circuit. The 275 hours at 400° F. obtained in this test with the grease of this invention is indicative of very superior high temperature performance properties, which are equal or even superior to those of ester base greases thickened with other finely divided organic solids of various types which have been employed heretofore to produce greases of improved high temperature performance properties. For example, a grease comprising the same polyester base and inhibitor thickened with finely divided indigo ran for 259 hours in this test at 400° F., and a grease comprising the same synthetic ester base and inhibitor thickened with finely divided copper phthalocyanine ran for only 119 hours at 400° F.

Obviously many modifications and variations of the invention, as hereinbefore set forth, may be made without departing from the spirit and scope thereof, and therefore, only such limitations should be imposed as are indicated in the appended claims.

I claim:
1. A lubricating grease consisting essentially of a lubricating oil thickened to a grease consistency with a compound represented by the formula

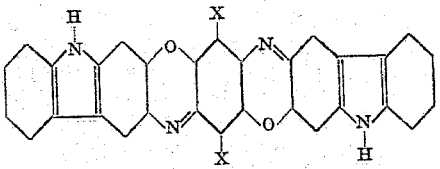

wherein X is chosen from the group consisting of hydrogen, —R and —OR groups, and halogens, and wherein R is a lower alkyl group containing from 1 to about 6 carbon atoms.

2. The grease composition according to claim 1 wherein R is an alkyl group containing 1-4 carbon atoms.
3. The grease composition according to claim 1 wherein X is a chlorine atom.
4. The grease composition according to claim 1 wherein X is a methoxy group.
5. The grease composition according to claim 1 wherein the said lubricating oil is a silicone oil.
6. The grease composition according to claim 1 wherein the said lubricating oil is a methylchlorophenyl silicone oil containing at least about 3 percent by weight of chlorine.
7. The grease composition according to claim 1 wherein the said lubricating oil is a synthetic polyester oil.
8. The grease composition according to claim 1 wherein the said lubricating oil comprises in major proportion at least a dicarboxylic acid polyester.

References Cited in the file of this patent
UNITED STATES PATENTS

| | | |
|---|---|---|
| 2,597,018 | Merker | May 20, 1952 |
| 2,679,480 | Brannen et al. | May 25, 1954 |
| 2,848,417 | Armstrong et al. | Aug. 19, 1958 |
| 2,851,418 | Lyons et al. | Sept. 9, 1958 |
| 2,880,176 | Roach et al. | Mar. 31, 1959 |
| 2,880,177 | Lyons et al. | Mar. 31, 1959 |